United States Patent
Cheng-Yao et al.

(10) Patent No.: US 8,736,848 B2
(45) Date of Patent: May 27, 2014

(54) NON-ENERGY DISSIPATING, CURVATURE SENSING DEVICE AND METHOD

(75) Inventors: Lo Cheng-Yao, Hsinchu (TW); Kuo Sheng-An, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 218 days.

(21) Appl. No.: 13/273,303

(22) Filed: Oct. 14, 2011

(65) Prior Publication Data

US 2013/0033710 A1    Feb. 7, 2013

(30) Foreign Application Priority Data

Aug. 3, 2011   (TW) .............................. 100127514 A

(51) Int. Cl.
G01B 11/02    (2006.01)
G01B 5/20     (2006.01)
G01B 11/24    (2006.01)

(52) U.S. Cl.
CPC . G01B 5/20 (2013.01); G01B 11/24 (2013.01)
USPC .......................................... 356/511; 356/506

(58) Field of Classification Search
USPC .......... 356/450, 511–514, 612, 504, 506, 519
See application file for complete search history.

(56) References Cited

U.S. PATENT DOCUMENTS 3,537,798 A * 11/1970 Smith et al. .................... 356/506
4,837,061 A   6/1989 Smits et al.
5,282,650 A   2/1994 Smith et al.
7,589,824 B2* 9/2009 Thierman .................... 356/3.01
2008/0192261 A1 8/2008 Schipke et al.

FOREIGN PATENT DOCUMENTS

| EP | 0 348 607 B1 | 8/1992 |
| JP | 05272944 A * | 10/1993 |
| TW | 1265313 | 11/2006 |
| TW | 200710705 | 3/2007 |
| TW | 200944749 A | 11/2009 |

OTHER PUBLICATIONS

Cheng-Yao Lo, "MEMS-Controlled Paper-Like Transmissive Flexible Display", Browse Journals & Magazines > Microelectromechanical System > vol. 19 Issue 2.
TIPO 1st Office Action dated Nov. 27, 2013.

* cited by examiner

*Primary Examiner* — Tarifur Chowdhury
*Assistant Examiner* — Willie Merrell, II
(74) *Attorney, Agent, or Firm* — Ditthavong Mori & Steiner, P.C.

(57) ABSTRACT

A non-energy dissipating, curvature sensing device senses curvature variation of a sample and comprises an outer layer, an inner layer and at least one spacer. The outer layer is flexible, transparent material and has a shape. The inner layer is flexible, transparent material, has a shape corresponding to the shape of the outer layer, is positioned under the outer layer and is thicker and harder than the outer layer. At least one spacer is positioned between the outer layer and the inner layer and creates space between the outer layer and the inner layer. A non-energy dissipating, curvature sensing method is also disclosed.

7 Claims, 7 Drawing Sheets

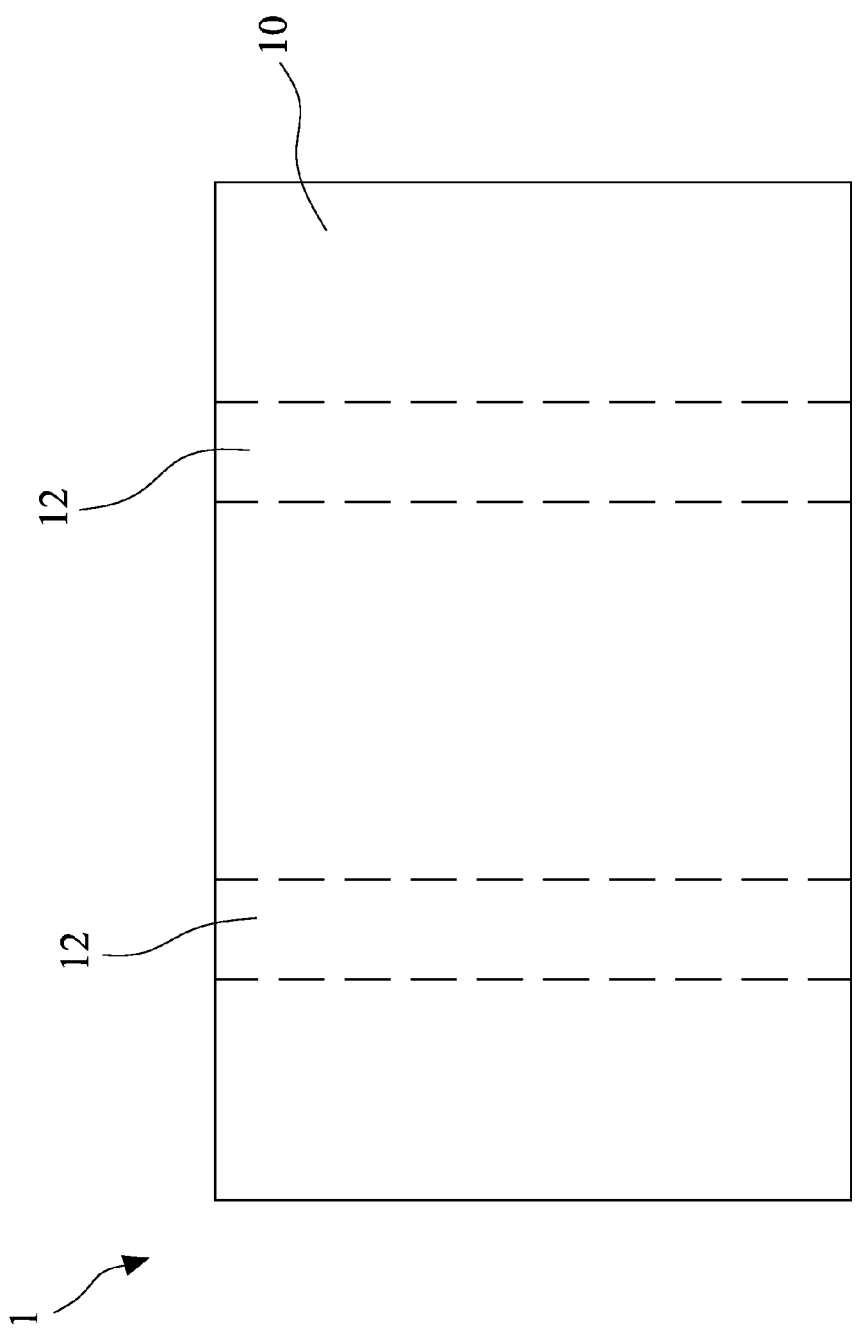

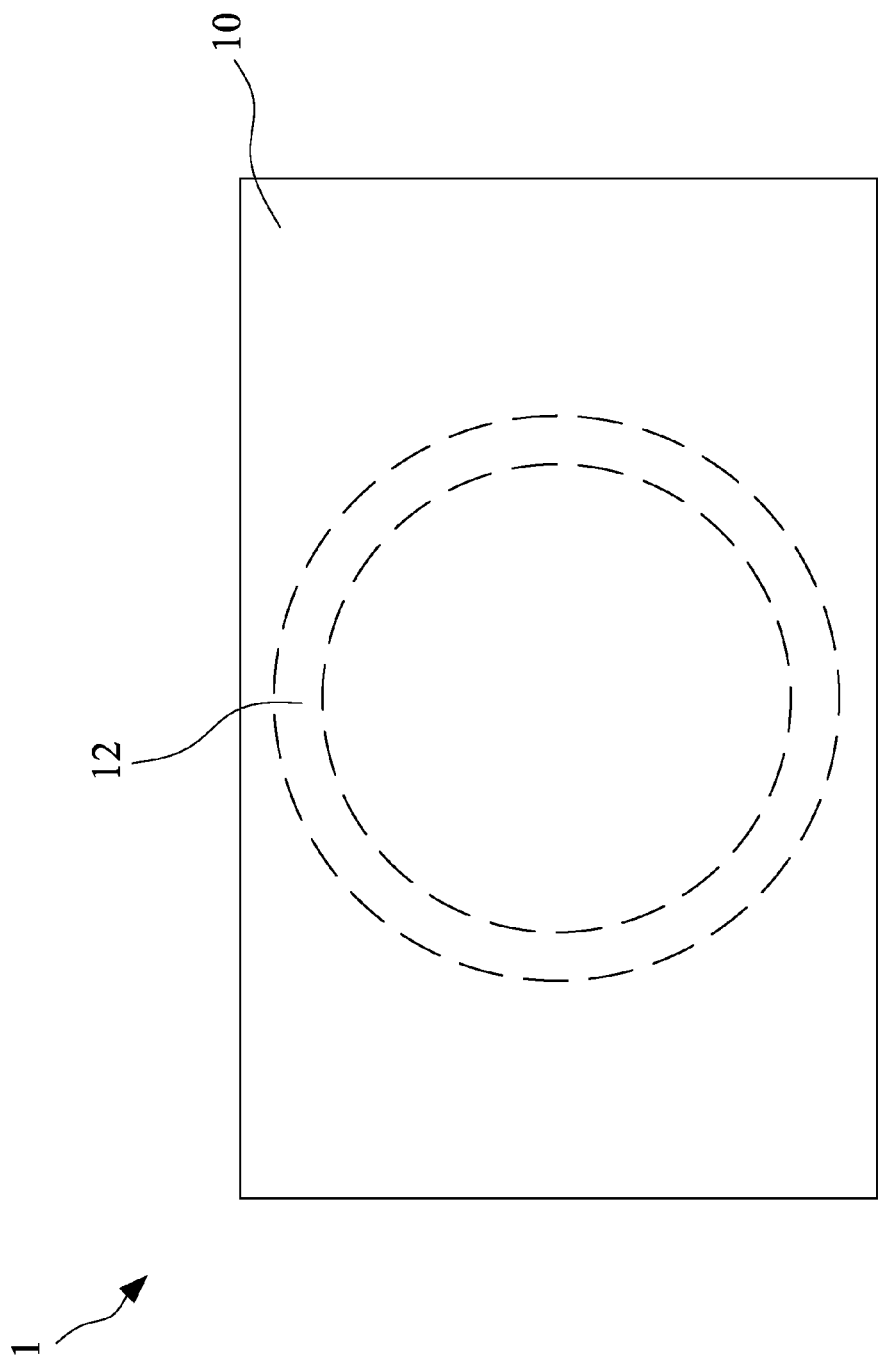

US 8,736,848 B2

NON-ENERGY DISSIPATING, CURVATURE SENSING DEVICE AND METHOD

FIELD OF THE INVENTION

The present invention is a non-energy dissipating, curvature sensing device and method.

BACKGROUND OF THE INVENTION

Conventional curvature sensors sense curvature variation of a sample, and each curvature sensor is mainly divided into a mechanical sensor and an optical sensor.

The mechanical sensor senses curvature variation of the sample by sensing tension or compression. The optical sensor senses curvature variation of the sample by using a light source.

U.S. Patent No. US 20080192261 discloses an apparatus and a method for examining a curved surface. The apparatus has a camera and a lamp. The camera can be aimed at the inside of the curved surface. The lamp can be located such that light emitted by the lamp is reflected from the inside of the curved surface into the camera.

However, the foregoing apparatus and method need an electrical source or a light source, which dissipate energy and cannot sense curvature variation of a sample remotely.

Accordingly, a new, non-energy dissipating, curvature sensing device and method are needed to overcome the foregoing problems.

SUMMARY OF THE INVENTION

The primary objective of the present invention is to sense curvature variation of a sample without dissipating energy and be able to be operated remotely.

A non-energy dissipating, curvature sensing device in accordance with the present invention senses curvature variation of a sample and comprises an outer layer, an inner layer and at least one spacer.

The outer layer is flexible, transparent material and has a shape. The inner layer is flexible, transparent material, has a shape corresponding to the shape of the outer layer, is positioned under the outer layer and is thicker and harder than the outer layer. At least one spacer is positioned between the outer layer and the inner layer and creates space between the outer layer and the inner layer.

A non-energy dissipating, curvature sensing method in accordance with the present invention senses curvature variation of a sample, uses ambient light and a non-energy dissipating, curvature sensing device that has an outer layer, an inner layer and at least one spacer and comprises steps of pressing the non-energy dissipating, curvature sensing device against the sample until the inner layer conforms to a surface of the sample and is performed in the presence of ambient light and determining whether the non-energy dissipating, curvature sensing device senses a curvature variation in the sample is performed by determining if interference fringes are produced in the non-energy dissipating, curvature sensing device.

BRIEF DESCRIPTION OF THE DRAWINGS

FIG. 4a is a top view of a first embodiment of a spacer in accordance with the present invention;

FIG. 4b is a top view of a second embodiment of a spacer in accordance with the present invention;

DETAILED DESCRIPTION OF THE PRESENT INVENTION

Figure 1:
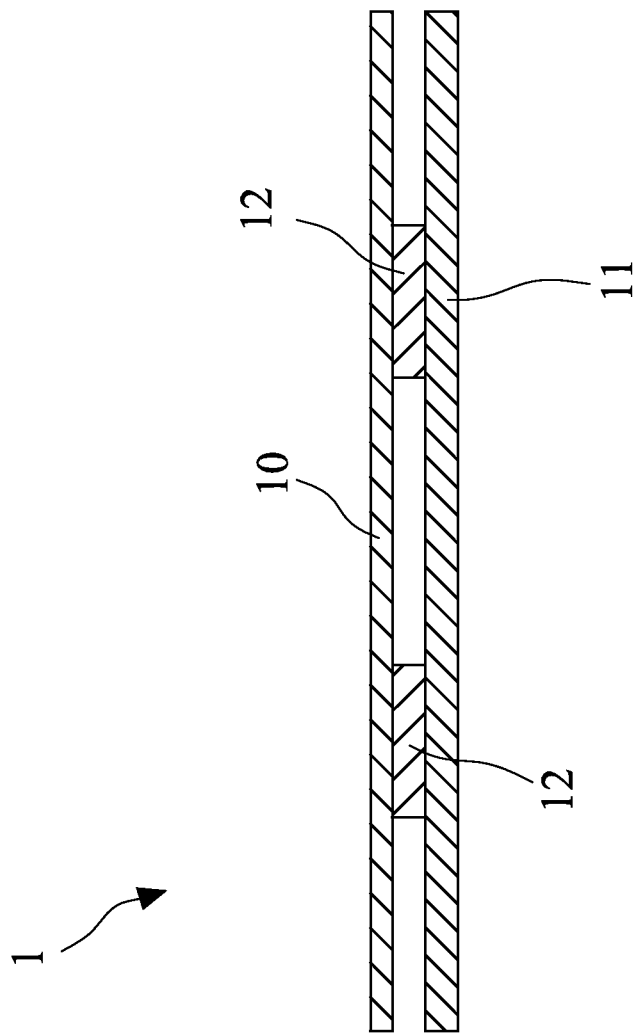
FIG. 1 is a cross-sectional side view of a first embodiment of a non-energy dissipating, curvature sensing device in accordance with the present invention.
Figure 2:
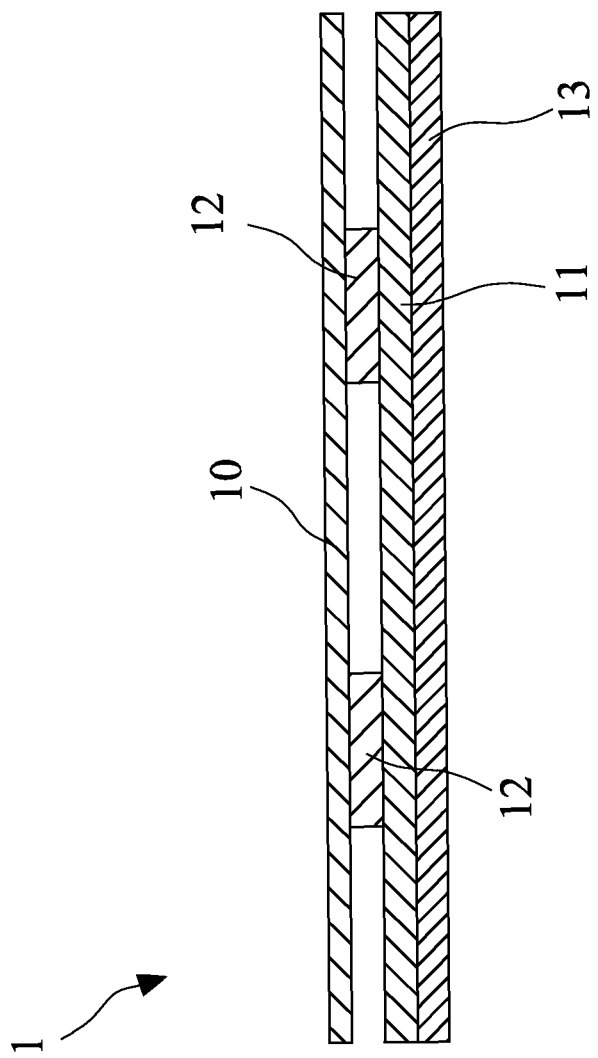
FIG. 2 is a cross-sectional side view of a second embodiment of a non-energy dissipating, curvature sensing device in accordance with the present invention.
Figure 3:
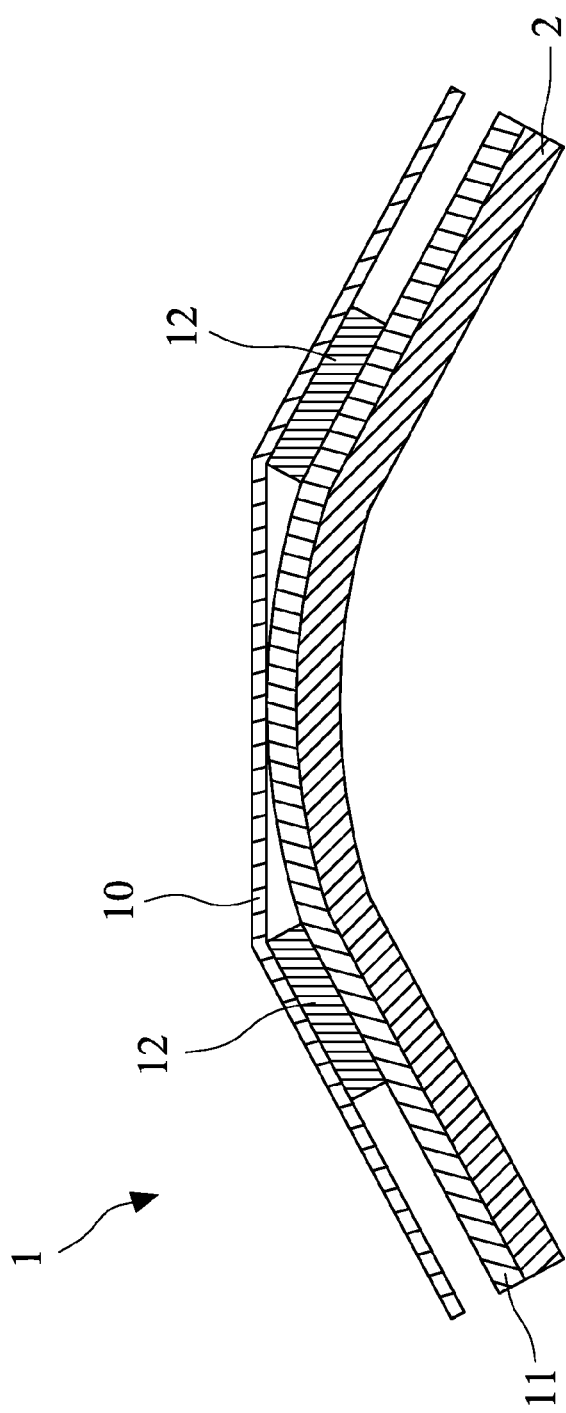
FIG. 3 is a cross-sectional side view of the first embodiment of the non-energy dissipating, curvature sensing device in FIG. 1 sensing curvature of a sample.

With reference to FIGS. 1 to 4b, a non-energy dissipating, curvature sensing device (1) in accordance with the present invention senses curvature variation of a sample (2) and comprises an outer layer (10), an inner layer (11), at least one spacer (12) and an optional, transparent, insulation layer (13).

The outer layer (10) is flexible, transparent material, has a shape, may be plated on a metal layer and may have a thickness less than 50 micrometers.

The inner layer (11) is flexible, transparent material, has a shape corresponding to the shape of the outer layer (10), is positioned under the outer layer (10), is thicker and harder than the outer layer (10), may be plated on a metal layer and may have a thickness greater than 200 micrometers.

At least one spacer (12) is positioned between the outer layer (10) and the inner layer (11), creates space between the outer layer (10) and the inner layer (11), may have a thickness less than 1 micrometer, may be flexible material and may be a polyhedron or a ring.

The optional, transparent, insulation layer (13) is positioned under the inner layer (11).

Figure 5:
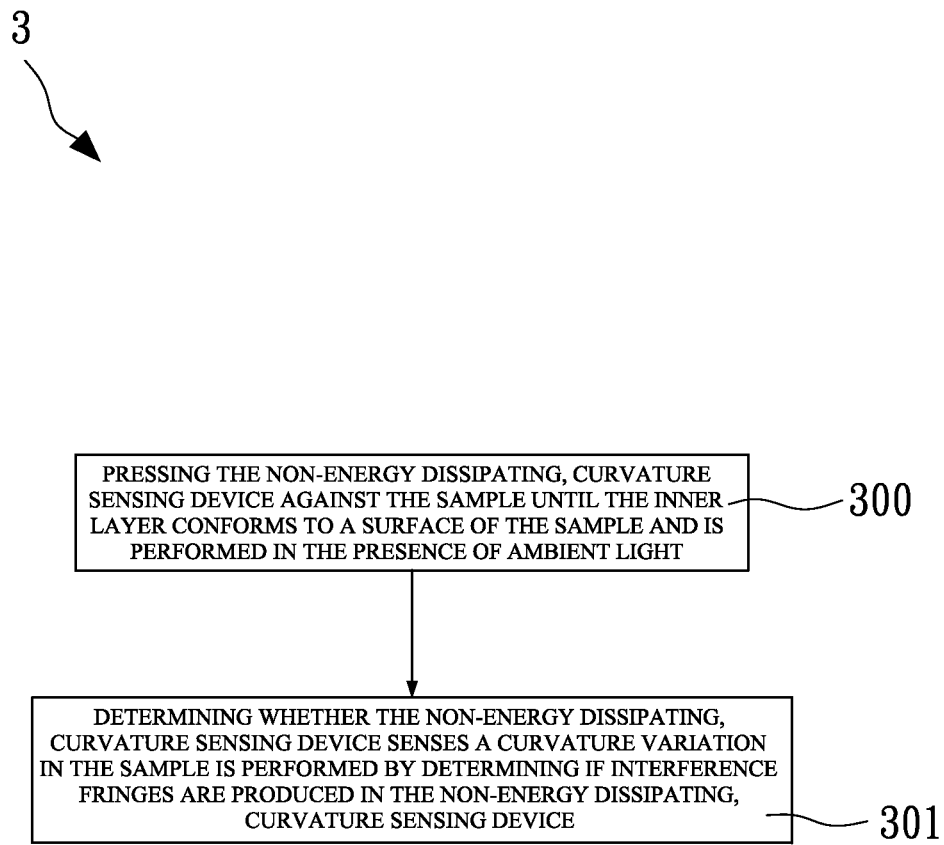
FIG. 5 is a flowchart of a first embodiment of a non-energy dissipating, curvature sensing method in accordance with the present invention.
Figure 6:
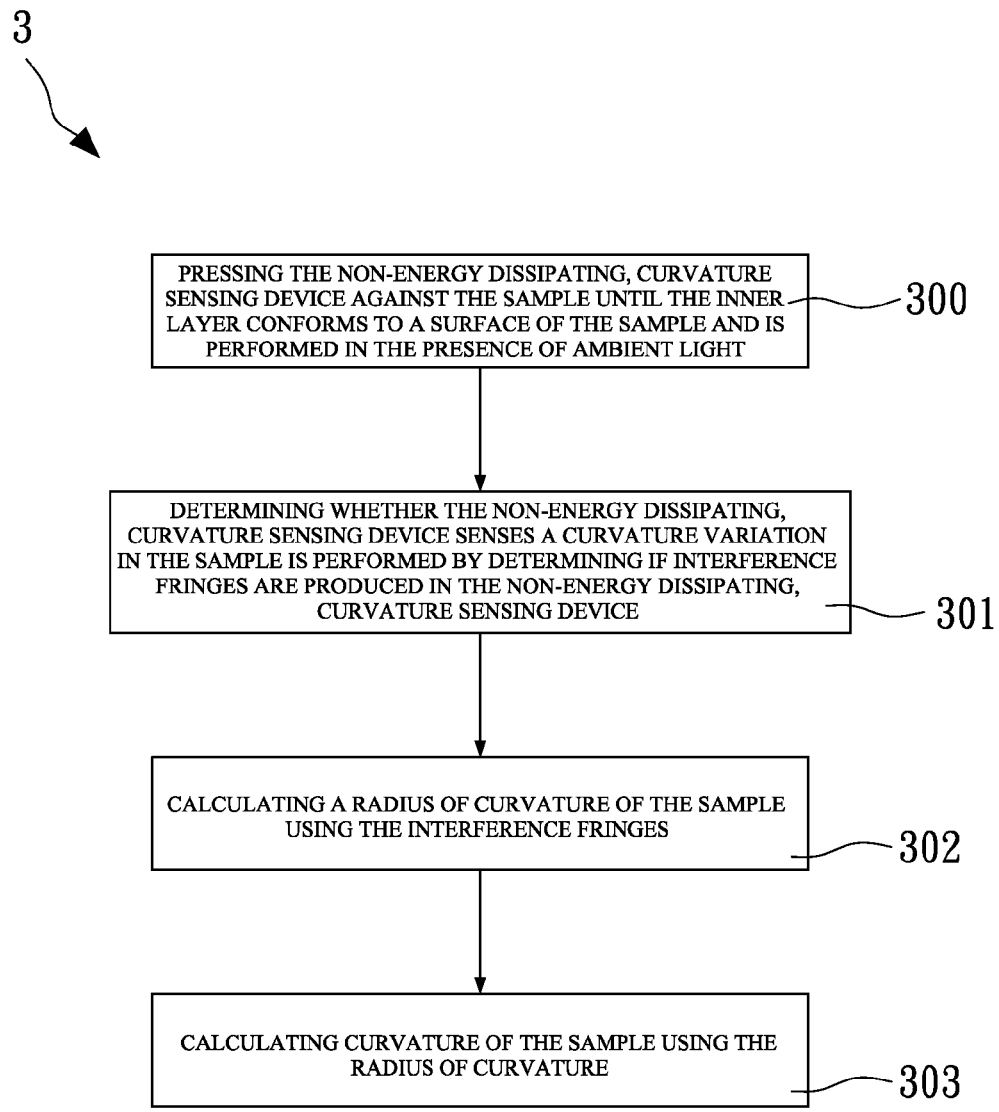
FIG. 6 is a flowchart of a second embodiment of a non-energy dissipating, curvature sensing method in accordance with the present invention.

With further reference to FIGS. 5 and 6, a non-energy dissipating, curvature sensing method (3) in accordance with the present invention senses curvature variation of a sample (2) that has a curvature and a radius of curvature, uses ambient light and a non-energy dissipating, curvature sensing device (1) having an outer layer (10), an inner layer (11) and at least one spacer (12) and comprises steps of (300) pressing the non-energy dissipating, curvature sensing device (1) against the sample (2) until the inner layer (10) conforms to a surface of the sample (2) and is performed in the presence of ambient light, (301) determining whether the non-energy dissipating, curvature sensing device (1) senses a curvature variation in the sample (2) is performed by determining if interference fringes are produced in the non-energy dissipating, curvature sensing device (1), an optional step (302) of calculating a radius of curvature of the sample (2) using the interference fringes and another optional step (303) of calculating curvature of the sample (2) using the radius of curvature.

Step (301) of determining whether the non-energy dissipating, curvature sensing device (1) senses a curvature variation in the sample (2) is performed by determining if interference fringes are produced in the non-energy dissipating, curvature sensing device (1). This step may be performed manually or by a camera.

The non-energy dissipating, curvature sensing device (1) produces interference fringes when the outer layer (10) and the inner layer (11) touch each other.

The step (302) of calculating a radius of curvature of the sample (2) using the interference fringes. The radius of curvature of the sample (2) is derived from the interference fringes.

The step (303) of calculating curvature of the sample (2) using the radius of curvature. The curvature of the sample (2) is a reciprocal of the radius of curvature of the sample (2).

Various changes can be made without departing from the broad spirit and scope of the invention.

What is claimed is:

1. A non-energy dissipating, curvature sensing method sensing curvature variation of a sample that has a curvature and a radius of curvature, using ambient light and a non-energy dissipating, curvature sensing device having an outer layer, an inner layer and at least one spacer and comprising steps of
    pressing the non-energy dissipating, curvature sensing device against the sample until the inner layer conforms to a surface of the sample and is performed in the presence of ambient light; and
    determining whether the non-energy dissipating, curvature sensing device senses a curvature variation in the sample is performed by determining if interference fringes are produced in the non-energy dissipating, curvature sensing device.

2. The non-energy dissipating, curvature sensing method as claimed in claim 1, wherein the step of determining whether the non-energy dissipating, curvature sensing device senses a curvature variation in the sample is performed by determining if interference fringes are produced in the non-energy dissipating, curvature sensing device is performed manually.

3. The non-energy dissipating, curvature sensing method as claimed in claim 1, wherein the step of determining whether the non-energy dissipating, curvature sensing device senses a curvature variation in the sample is performed by determining if interference fringes are produced in the non-energy dissipating, curvature sensing device is performed by a camera.

4. The non-energy dissipating, curvature sensing method as claimed in claim 1, further comprising steps of
    calculating a radius of curvature of the sample using the interference fringes; and
    calculating curvature of the sample using the radius of curvature.

5. The non-energy dissipating, curvature sensing method as claimed in claim 1, wherein the non-energy dissipating, curvature sensing device produces interference fringes when the outer layer and the inner layer touch each other.

6. The non-energy dissipating, curvature sensing method as claimed in claim 4, wherein the radius of curvature of the sample is derived from the interference fringes.

7. The non-energy dissipating, curvature sensing method as claimed in claim 4, wherein the curvature of the sample is a reciprocal of the radius of curvature of the sample.

* * * * *